United States Patent Office 2,855,393
Patented Oct. 7, 1958

2,855,393
CHROMIUM CONTAINING DYESTUFFS

Guido Schetty and Walter Biedermann, Basel, Switzerland, assignors to J. R. Geigy A. G., Basel, Switzerland, a Swiss firm No Drawing. Application November 24, 1954
Serial No. 471,094

Claims priority, application Switzerland
November 26, 1953

6 Claims. (Cl. 260—145)

The present invention concerns chromium containing dyestuffs which, apart from any carboxyl groups present taking part in the complex formation, contain no acid water-solubilising groups. It also concerns the production process for such chromium complex dyestuffs and their use, in particular for the dyeing of lacquers, cellulose esters, e. g. in the form of acetate rayon, natural and synthetic polypeptide fibres such as wool, silk, superpolyamide and superpolyurethane fibres, and for the dyeing of leather.

It has been found that new dyestuffs containing chromium bound in complex linkage which are often distinguished by particularly pure shades are obtained if an agent giving off chromium, a metallisable monoazo dyestuff and a metallisable azo methine dyestuff, which dyestuffs do not contain any further acid water-solubilising groups apart from carboxyl groups which may be present taking part in the complex formation, are reacted under such conditions or in any order desired so that compounds are formed of the general formula

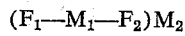

$$(F_1-M_1-F_2)M_2$$

In this formula, $F_1$ represents a metallisable monoazo and $F_2$ represents a metallisable azo methine dyestuff and also $M_1$ represents the chromium atom bound in complex linkage and $M_2$ a monovalent cation or the equivalent thereof.

As monoazo and azo methine dyestuffs such can be used in the process according to the present invention which, in the neighbouring position to the azo or azo methine bridge on both sides each contain a substituent capable of forming the metal complex or a substituent which, under the metallising conditions, can be converted into such a substituent. It is of advantage for the chromium complexes according to the present invention that the dyestuff components be so chosen that there is on the one side a hydroxyl or an enolisable carbonyl group as complex forming group and on the other side also a hydroxyl, a carboxyl group, and also, possibly, an alkoxy group. They should not contain water-solubilising acid groups such as sulphonic acid groups and carboxyl groups not taking part in the complex formation. On the other hand, nonionogenic substituents usual in azo dyestuffs are admissible, e. g. halogen, alkyl, alkoxy, nitro, acylamino, alkyl and aryl sulphonyl, sulphonic acid dialkylamide or sulphonic acid phenyl alkylamide groups. The presence of substituents which increase the water-solubility without dissociation with an acid reaction in water is particularly suitable in the application of chromium containing dyestuffs according to the present invention for use in textile dyeing. Examples of such substituents are, e. g. the sulphonic acid amide group, sulphonic acid amide groups organically monosubstituted at the nitrogen atom, sulphonic acid-N-alkyl-N-alkanolamide groups, lower alkyl and alkenyl sulphonyl groups with for example 1 to 4 carbon atoms in the alkyl radical, as well as acetylamino groups. It is of advantage for the use in textile dyeing of the chromium containing dyestuffs according to the present invention that there be at least one of these groups present either in the azo, or in the azo methine dyestuff or in both constituent dyestuffs.

The monoazo dyestuffs usable according to the present invention are obtained from diazotised aromatic o-hydroxyamino-, o-carboxyamino- and also possibly o-alkoxyamino compounds by coupling with azo components which couple in neighbouring position to a hydroxy or enolisable carbonyl group, which can be further substituted according to the definition.

Metallisable azo methine dyestuffs are obtained from aromatic o-hydroxyamino- or o-carboxyamino compounds and aromatic o-hydroxy aldehydes which also may be further substituted as defined above. In the process according to the present invention however, it is not necessary to produce the metallisable azo methine dyestuffs in substance, on the contrary, the use of equimolecular mixtures of components capable of forming the azo methine dyestuff is sufficient.

Compounds of co-ordinative hexavalent chromium can be used for metallising the dyestuffs, e. g. the salts of chromium. Both normal salts of organic or inorganic acids and also complex salts can be used, e. g. the ammine or acido salts and, in particular also, salt-like compounds with colourless organic or inorganic complex-formers such as, e. g. salts of chromosalicylic acid. The metallisation is performed advantageously in the warm in organic or inorganic inert diluents, e. g. in aqueous solution or suspension with such dyestuffs as are soluble, even if only slightly, in water or in organic solvents such as lower alcohols, lower ketones, lower ethers, either open or in the form of a ring, ether alcohols, amides or dialkylamides of lower fatty acids. The reaction of agents giving off chromium with equimolecular mixtures of metallisable azo and azo methine dyestuffs is performed advantageously in a neutral to alkaline medium or in the presence of agents which bind the mineral acid, such as alkali acetates. The chroming agent is used in such amounts that there is at least one chromium atom to two dyestuff molecules. Particularly uniform and pure chromium containing dyestuffs according to this invention are obtained if one dyestuff component, i. e. either the azo methine or, preferably, the azo dyestuff is first converted by methods known per se, advantageously in the presence of mineral acids in an organic inert solvent, into that complex chromium compound which contains one complete chromium atom bound in complex linkage and then the other dyestuff is added in aqueous or organic solution in organic acid, neutral or alkaline medium and always with advantage in the presence of mineral acid binding salts, and, if desired converted into the alkali metal salts. Instead of mineral acid salts of chromium containing azo or azo methine dyestuffs which, to one dyestuff molecule, contain a chromium atom bound in complex linkage, also the addition compounds thereof with metallisable organic compounds which in themselves have no dyestuff character, can be used, e. g. the addition compounds with organic o-hydrocarboxylic acids such as salicylic acid or sulphosalicylic acid which are also traced as intermediate products in the chroming of metallisable azo dyestuffs with salts of chromosalicylic acids.

The new chromium containing dyestuffs which contain both a metallisable azo and azo methine dyestuff bound to the same chromium atom have interesting new shades. With the help of these dyestuffs, it is possible for example to produce yellow-orange, yellow-red, yellow-brown, green-blue and yellow-green new chromium compounds which, insofar as they are used in textile dyeing, are distinguished by very good fastness to light on wool and synthetic polypeptide fibres. Some of them are also distinguished by their pure shades.

The following examples illustrate the invention without limiting it in any way. Where not otherwise stated, the parts are given as parts by weight and the temperatures are in degrees centigrade. The relationship of parts by weight to parts by volume is as that of kilogrammes to litres.

Example 1

1.34 parts of 2-hydroxybenzaldehyde and 1.44 parts of 4-chloro-2-amino-1-hydroxybenzene are boiled for half an hour in 100 parts of alcohol. 6.7 parts of a complex chromium compound of the dyestuff from diazotised 2-amino-1-hydroxy-benzene-4-methyl sulphone and 1-(3'-chlorophenyl)-3-methyl-5-pyrazolone which contains one chromium atom to one molecule of dyestuff (corresponding to 0.52 part of chromium) and 2 parts of crystallised sodium acetate are added and the whole is boiled for a further hour. The alcohol is then distilled off and the residue is taken up with 20 parts by volume of 1 N-caustic soda lye and 100 parts of hot water. The dyestuff is precipitated by the addition of sodium chloride, filtered off and dried. It is an orange powder which dyes wool from an acetic acid bath in pure yellow-orange shades. The composition of the chromium containing dyestuff corresponds to the following:

Similar dyestuffs are obtained if, instead of 1.44 parts of 4-chloro-2-amino-1-hydroxybenzene, 1.22 parts of 2-amino-1-hydroxybenzene, 1.54 parts of 4-nitro-2-amino-1-hydroxybenzene, 1.87 parts of 2-amino-1-hydroxybenzene-4-methyl sulphone are used or if 2.0 parts of 3.5-dichloro-2-hydroxy-1-benzaldehyde are used instead of 1.33 parts of 2-hydroxybenzaldehyde.

Example 2

6.7 parts of the di-sodium salt of the complex chromium compound consisting of one molecule of the dyestuff from diazotised 4-nitro-2-amino-1-hydroxybenzene and 1-phenyl-3-methyl-5-pyrazolone, one chromium atom and one molecule of sulphosalicylic acid (corresponding to 0.52 part of Cr) and 1.22 parts of 2-hydroxybenzaldehyde, 1.9 parts of 2-amino-1-hydroxybenzene-4-methyl sulphone and 2 parts of crystallised sodium acetate are boiled under reflux for 2 hours in 200 parts of alcohol. The product is then worked up as described in Example 1. The dyestuff obtained dyes wool from a weakly organic acid bath in yellowish-orange shades.

The new dyestuff corresponds to the formula:

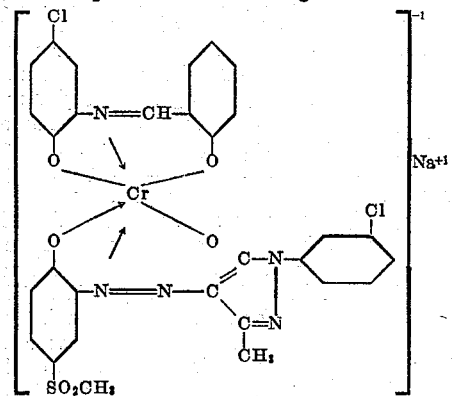 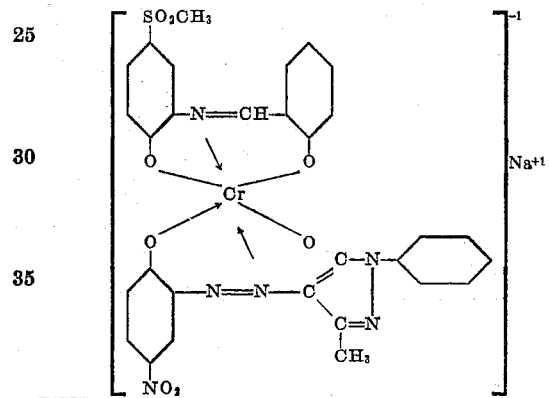

| No. | M₁ | 1:1 complex of the dyestuff | Azo methine dyestuff from— | | Colour on wool |
|---|---|---|---|---|---|
| | | | aldehyde | 2-hydroxyamino-aryl compound | |
| 1 | Na | 2-aminobenzoic acid ⟶ 1-phenyl-3-methyl-5-pyrazolone. | 2-hydroxybenzaldehyde | 2-amino-1-hydroxy-benzene-4-methyl sulphone. | yellow. |
| 2 | K | 5-nitro-2-amino-1-hydroxybenzene ⟶ 1-phenyl-3-methyl-5-pyrazolone. | ___do___ | 4-chloro-2-amino-1-hydroxybenzene. | red. |
| 3 | Na | 4-nitro-2-amino-1-hydroxybenzene ⟶ 4-methyl-1-phenol. | ___do___ | 4-nitro-2-amino-1-hydroxybenzene. | yellowish brown. |
| 4 | Li | 2-amino-1-hydroxybenzene-4-methyl sulphone ⟶ 1-(3'-chlorophenyl)-3-methyl-5-pyrazolone. | ___do___ | 1-amino-2-hydroxynaphthalene. | orange. |
| 5 | Na | 4-nitro-2-amino-1-hydroxybenzene ⟶ 4-methyl-1-phenol. | ___do___ | 1-amino-2-hydroxybenzene. | brown. |
| 6 | NH₄ | ___do___ | ___do___ | 1-amino-2-hydroxynaphthalene. | Do. |
| 7 | Na | 2-amino-1-hydroxybenzene-4-sulphamide ⟶ 1-(3'-sulphamido-phenyl)-3-methyl-5-pyrazolone. | 3.5-dichloro-2-hydroxy-1-benzaldehyde. | 1-amino-2-hydroxybenzene. | orange. |
| 8 | Li | 2-amino-1-hydroxybenzene-4-methyl sulphone ⟶ 2-hydroxynaphthalene. | 2-hydroxy-1-benzaldehyde. | 2-amino-1-benzoic acid. | lilac. |
| 9 | NH₄ | ___do___ | ___do___ | 1-amino-2-hydroxynaphthalene. | Do. |
| 10 | Na | 4-methoxy-2-amino-1-hydroxybenzene ⟶ 1-hydroxynaphthalene-3-sulphodimethylamide. | ___do___ | 4-chloro-2-amino-1-hydroxybenzene. | green. |
| 11 | K | ___do___ | ___do___ | 2-amino-1-hydroxybenzene-4-methyl sulphone. | Do. |
| 12 | Na | 4-nitro-2-amino-1-hydroxybenzene ⟶ 3.4-dimethyl-1-phenol. | ___do___ | 2-amino-1-hydroxybenzene. | brown. |
| 13 | Na | ___do___ | ___do___ | 4-nitro-2-amino-1-hydroxybenzene. | Do. |
| 14 | Na | 1-amino-2-hydroxynaphthalene ⟶ 2-hydroxynaphthalene-6-sulphomethyl-ethanolamide. | ___do___ | 2-amino-1-hydroxybenzene-4-sulphamide. | olive. |
| 15 | Li | 1-amino-2-hydroxynaphthalene ⟶ 2-hydroxynaphthalene. | ___do___ | ___do___ | Do. |
| 16 | Na | 4-chloro-2-aminobenzoic acid ⟶ 1-phenyl-3-methyl-5-pyrazolone. | ___do___ | 2-amino-1-hydroxybenzene-4-methyl sulphone. | yellow. |
| 17 | Li | 2-amino-1-hydroxybenzene-4-methyl sulphone ⟶ 2-hydroxynaphthalene. | ___do___ | 4-chloro-2-aminobenzoic acid. | lilac. |
| 18 | Na | 2-amino-1-hydroxybenzene-4-methyl sulphone ⟶ 1-(3'-chlorophenyl)-3-methyl-5-pyrazolone. | 2-hydroxy-1-naphthaldehyde. | 1-amino-2-hydroxynaphthalene. | orange. |
| 19 | Na | ___do___ | ___do___ | 1-amino-2-hydroxybenzene. | Do. |

Example 3

36.4 parts of the monosodium salt of the dyestuff from diazotised 2-amino-1-hydroxybenzene-4-methyl sulphone and 2-naphthol, 12 parts of 2-amino-1-hydroxybenzene and 13.4 parts of 2-hydroxybenzaldehyde in 500 parts of water are boiled under reflux with 220 parts of a solution of ammonium chromosalicylate (corresponding to 5.7 parts of chromium) until the non-chromium containing azo dyestuff has disappeared, which is about for one hour. The dyestuff is then precipitated by the addition of sodium chloride, filtered off and dried. It dyes wool from an acetic acid bath in brown-violet shades.

Example 4

51 parts of the chromium containing azo methine dyestuff from 2-amino-1-hydroxybenzene and 2-hydroxybenzaldehyde which contains two dyestuff molecules to one chromium atom (corresponding to 5.2 parts of Cr) are boiled with 30 parts of the dyestuff from diazotised 4-chloro-2-amino-1-hydroxy-benzene and 2-naphthol and 12 parts of sodium bicarbonate in 750 parts of water until the non-chromium containing azo dyestuff has disappeared, which is for about 18 hours. The dyestuff is precipitated by the addition of sodium chloride. It is filtered off and dried. It dyes wool from a weakly acetic acid bath in brown-violet shades.

The mixed azo-azomethine complex metal dyestuffs given in the table can be produced according to the methods given in Examples 1 to 4.

What we claim is:

1. A complex chromium compound of the general formula:

(F—Cr—F′)M wherein M is a member selected from the group consisting of alkali metal and ammonium cations and F is a co-ordinated monoazo dyestuff of the formula:

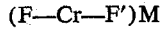

and F′ is a co-ordinated azo methine dyestuff of the formula:

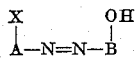

wherein A and D represent a member selected from the group consisting of radicals of the benzene and naphthalene series, B represents a member selected from the group consisting of radicals of phenolic, naphtholic and enolic coupling components, containing the hydroxy group in ortho-position to the azo group, E represents a member selected from the group consisting of radicals of the benzene and naphthalene series containing the hydroxy group in o-position to the azo methine group, X and Y represent a metallisable group in o-position to the N-group selected from the group consisting of OH and COOH, A, B, D and E being otherwise free from carboxylic acid and sulphonic acid groups.

2. A complex chromium compound of the formula:

(F—Cr—F′)M wherein M is a member selected from the group consisting of alkali metal and ammonium cations and F is a co-ordinated monoazo dyestuff of the formula:

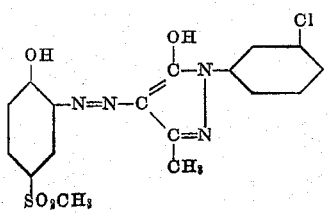

and F′ is a co-ordinated azo methine dyestuff of the formula:

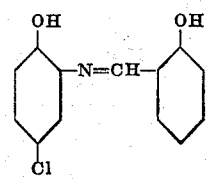

3. A complex chromium compound of the formula (F—Cr—F′)M wherein M is a member selected from the group consisting of alkali metal and ammonium cations and F is a co-ordinated monoazo dyestuff of the formula:

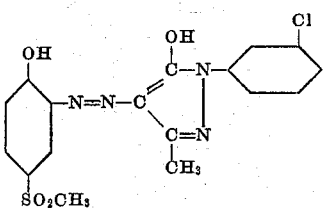

and F′ is a co-ordinated azo methine dyestuff of the formula:

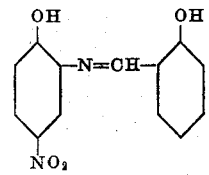

4. A complex chromium compound of the formula:

(F—Cr—F′)M wherein M is a member selected from the group consisting of alkali metal and ammonium cations and F is a co-ordinated monoazo dyestuff of the formula:

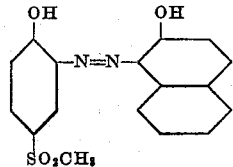

and F′ is a co-ordinated azo methine dyestuff of the formula:

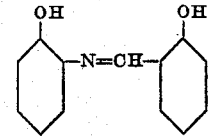

5. A complex chromium compound of the formula (F—Cr—F′)M wherein M is a member selected from the group consisting of alkali metal and ammonium cations and F is a co-ordinated monoazo dyestuff of the formula:

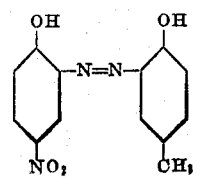

and F' is a co-ordinated azo methine dyestuff of the formula:

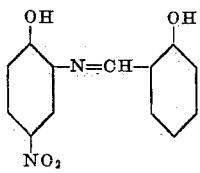

6. A complex chromium compound of the formula:

(F—Cr—F')M wherein M is a member selected from the group consisting of alkali metal and ammonium cations and F is a co-ordinated monoazo dyestuff of the formula:

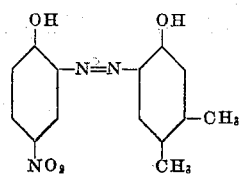

and F' is a co-ordinated azo methine dyestuff of the formula:

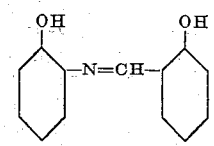

References Cited in the file of this patent
UNITED STATES PATENTS

| | | |
|---|---|---|
| 2,116,913 | Schmidt | May 10, 1938 |
| 2,610,175 | Widmer et al. | Sept. 9, 1952 |
| 2,708,193 | Pfitzner et al. | May 10, 1955 |
| 2,711,404 | Schetty | June 21, 1955 |

FOREIGN PATENTS

| | | |
|---|---|---|
| 512,875 | Belgium | Aug. 14, 1952 |